Feb. 5, 1935.  C. S. SALTER  1,990,134

METHOD OF PRODUCING ARTISTS' CHARCOAL

Filed Nov. 20, 1931

Inventor
Carl S. Salter

By
Jack A. Ashley
Attorney

Patented Feb. 5, 1935

1,990,134

UNITED STATES PATENT OFFICE 1,990,134

METHOD OF PRODUCING ARTISTS' CHARCOAL

Carl S. Salter, Brownwood, Tex., assignor of one-fourth to Douglas Coalson, Brownwood, Tex.

Application November 20, 1931, Serial No. 576,330

6 Claims. (Cl. 202—5)

This invention relates to new and useful improvements in methods of producing artists' charcoal.

One object of the invention is to provide an improved method for producing stick charcoal such as is usually produced from natural wood and is used by artists, sign painters and other artisans.

A particular object of the invention is to provide a method whereby a better quality of stick charcoal may be produced in an expeditious manner and at a low cost.

A further object of the invention is to provide a method whereby the charcoal may be produced in sticks of predetermined size and shape, and the warping, splitting and shattering substantially eliminated; and also whereby a much higher percentage of perfect sticks is recovered and loss and waste is reduced to a minimum.

Another object of the invention is to provide a method of producing stick charcoal whereby the degree of firmness or hardness of the finished stick may be effectually calculated, and the finished product produced in accordance with said calculations so as to possess the desired degree or grade of firmness and hardness anticipated.

Substantially all of the stick charcoal used by artists and artisans and now on the market is either made from powdered charcoal compressed into stick form, or from split wood or wood from which the bark has been peeled. The compressed stick form has nothing in common with this invention, and therefore will not be discussed.

The stick charcoal now in common use is all produced from small limbs, stems, vines, or split sticks. It is obvious that there can be no uniformity of contour or general shape from such stock. With this in view a step whereby the sticks are cut or sawed to a uniform shape and length will be appreciated. Further, the present finished sticks are more or less warped, curved and split. When produced by my method the sticks are not only of uniform length but are substantially free from lateral distortions and curvature, and are therefore nearly all straight, which makes them more easily handled and more readily packed, as well as being less liable to breakage.

Figure 1:
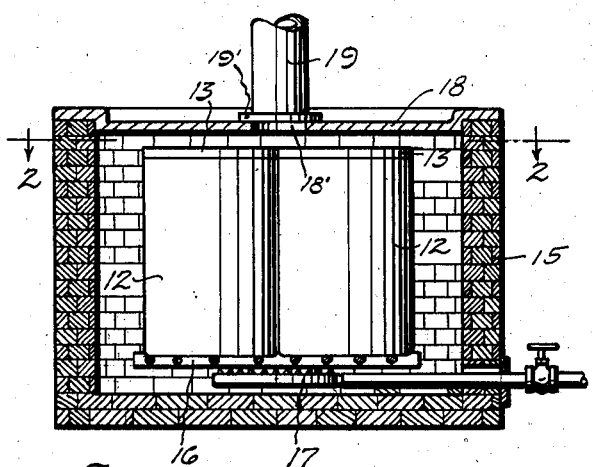
Figure 3:
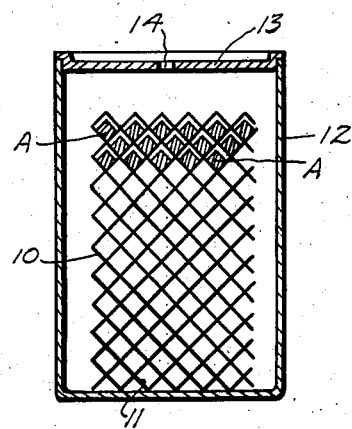
Figure 2:
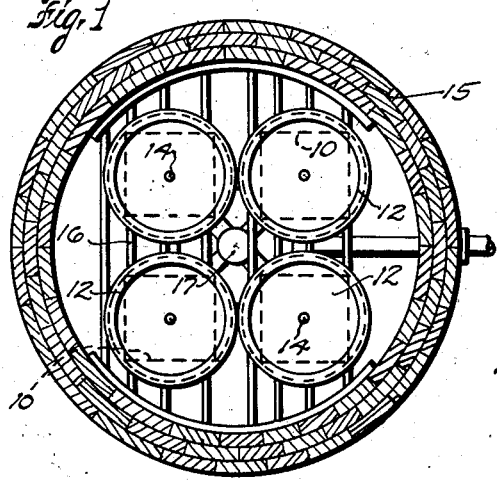
Figure 4:
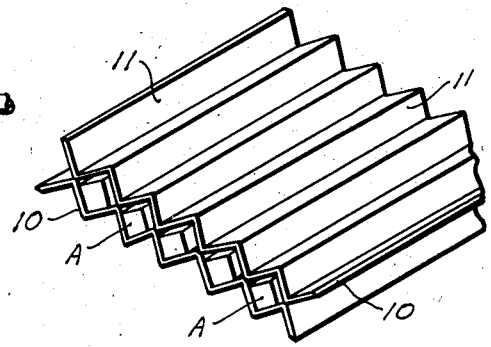
Figure 5:
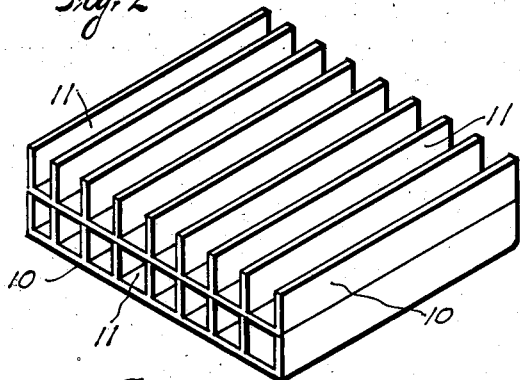
Figure 6:
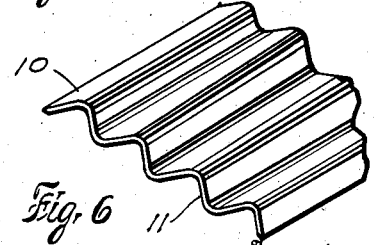

The invention will be more readily understood from a reading of the following specification and by reference to the accompanying drawing in which means for carrying out the method are illustrated and wherein:

Figure 1 is a view, partly in section and partly in elevation, of a kiln containing pots for carrying out the method, Figure 2 is a horizontal cross-sectional view taken on the line 2—2 of Figure 1, Figure 3 is an enlarged transverse vertical sectional view of one of the pots with sticks stacked therein, and Figures 4, 5 and 6 are isometrical views showing different forms of trays for supporting the sticks.

In carrying out the invention I provide suitable sticks from willow or other wood suitable for the purpose. While it is possible in my method to use split sticks and sticks obtained by peeling the bark from limbs, stems, vines, et cetera, I prefer to provide the sticks by cutting or sawing blocks of the proper wood into sticks of the desired shape and length. Sticks cut or sawed in this manner may be square, round, triangular, hexagonal, or otherwise shaped in cross-section. Such sticks may have the proper dimensions as to length and thickness or width.

The condition of the wood will somewhat control the carrying out of the method. My method permits of the use of wood in any condition either dry or green. The charcoal sticks may be more quickly produced from dry wood, and therefore the wood may be partly seasoned, or could be kiln dried, but can be used green.

One of the features of the method consists in confining each stick in a duct, channel or chamber while said stick is being treated to convert it into charcoal. By this arrangement, it has been found that the stick is constrained against warping, distorting and splitting both during the charring and the cooling steps. The means for confining the sticks is, of course, capable of considerable variation.

In the drawing the numeral 10 designates a tray or pan which is provided with a plurality of parallel ducts 11. In Figures 3 and 4 these ducts are shown as V-shaped in cross-section, while in Figure 5 the ducts are square in cross-section, and in Figure 6 they are arcuate in cross-section. The particular shape of the ducts and the consequent general formation of the tray is subject to considerable variation, but it is obvious that sticks which are angular in cross-section are best suited for use with the trays shown in Figures 4 and 5, while the tray of Figure 6 is best adapted to round sticks.

Sticks A are placed in the ducts 11 of the first tray and then a second tray 11 is rested upon the first tray with its valleys upon the ridges of the underlying tray. A number of trays are stacked in this manner and then the trays, filled with sticks, are placed in a pot 12, which is provided with a tight-fitting lid 13 having a central vent opening 14.

It is pointed out that it is preferable to use a cylindrical pot so that the corners of the trays will rest against the inner side wall of the pot, whereby the trays will be held in position and prevent them from shifting. This arrangement will also provide adequate air spaces on all four sides of the trays. Of course, other shapes of pots could be used and means for holding the trays in place provided. The sticks and trays may be stacked either outside of the pot and then placed in the pot or they may be stacked inside of the pot. Each pot is substantially free from air openings except the vent 14.

A number of pots are assembled in a kiln 15 upon a grate 16. Below the grate is disposed a gas burner 17 so as to direct its flame against the bottoms of the pots. It is here pointed out that any number of pots may be assembled in any suitable kiln and heated in any adequate manner. A suitable lid 18 is placed upon the top of the kiln and provided with a vent pipe 19. The pipe has a collar 19' resting on the lid so the lower end of the pipe may fit in an opening 18' in said lid and said pipe may be removed when desired.

It is of course, important that the sticks be charred by the heat and not burned by ignition. It is therefore important that the proper steps be followed and instrumentalities suitable for the purpose be used. I have secured very good results by using pots made of heavy sheet metal and have found that if the walls of the pots are too thick or too thin, the results obtained are not as satisfactory as where a metal pot made of about 12 gauge metal is used. However, I do not wish to be limited either to this gauge or to a metal pot, as any container which will properly char the wood without igniting it may be used.

When the pots are placed in the kiln they should be gradually heated, and therefore a low flame is at first used. If the wood is green a longer time will be required in the pre-heating than where dry wood is used because the green wood will contain more moisture. When the pots have been warmed up the flame is gradually turned up until the maximum heating point is reached. This period of bringing the heating flame up to its maximum point may vary and usually fifteen to twenty minutes has been found ample. When the wood begins to char it will smoke and this smoke escaping through the vent hole 14 will pass out through the vent pipe 19.

The charring period will vary according to the condition of the wood and the temperature generated in the kiln. I have produced charcoal sticks in from forty-five minutes to two hours, but this time is subject to variation. A temperature of from 375° to 575° Fahrenheit has been found to be satisfactory, but conditions may arise where other temperatures would be used.

While the wood is being charred in the pots it is, of course, carbonizing and this produces smoke. When substantially all of the moisture is driven out of the sticks the smoking will cease and at this point the intense heat will drive off the gases from the wood. The control or regulation of the flame from the burner 17 during the gassing period has much to do with the degree of firmness or hardness of the finished stick. If the flame is maintained at its maximum during the entire gassing period very soft sticks will be produced, but if it is cut down or extinguished during the gassing period various degrees of hardness will be acquired, dependent upon the length of time the flame is burned and its regulation.

It is necessary to discharge the gas from the pots before the carbonization is complete and when the gas begins to flow the operator will be notified by the noise made when the gas discharges from the vents 14, and he may remove the pipe 19, insert a lighted taper through the opening 18' and ignite the gas jets flowing from the vents 14. When the jets or flames cease to burn it is evidence that substantially all of the gas has been extracted. Of course it is not necessary to ignite this gas as it would be driven off anyway, but the igniting is a convenient way of ascertaining when the gas has all been driven off. The gassing period usually consumes from five to ten minutes, but this is subject to variation. The burner 17 is either extinguished during the gassing period or at the end thereof, according to the grade of stick desired.

The success of the method depends to a great extent upon the cooling of the charred sticks because the contraction or shrinkage of the sticks takes place during the cooling step and also the distortion of the sticks occurs during this period. If the cooling is too sudden, the sticks will crack or split and frequently distintegrate. By confining the sticks in the ducts, their distortion is substantially defeated.

After the gassing period the pots are allowed to remain in the kiln and the lid 18 is usually retained in place. The climatic conditions have somewhat to do with the cooling step. Where the lid 18 is not removed usually one hour, more or less, is consumed before the pots are removed from the kiln; but if the lid is removed then less time elapses before the pots are removed. When the pots have cooled sufficiently to be handled with ordinary cotton gloves they may be removed from the kiln and suitably placed for further cooling, which may require from one to two hours, more or less, according to the temperature of the air outside of the pots.

The lids 13 are not removed from the pots until both the pots and the sticks are cool and the ideal time for opening the pots and removing the sticks is when the temperature of the air outside of the pots and the temperature of the sticks are substantially the same. In other words a normal temperature would be the temperature of the air surrounding the pots and when the sticks have cooled to this normal temperature they could be safely removed and handled. By confining the sticks during the cooling period they are permitted to shrink because of the open ended ducts, but are prevented from curling or distorting laterally; but such confining of the sticks would not protect them from the disastrous results which would occur if they were subjected to cold air or the pots opened too soon.

It is difficult to set forth invariable rules of data for carrying out a method of this nature because much will depend upon the condition of the wood at the start of the method, the surrounding climatic conditions, the degree of heat available and used, and the grade or degree of hardness or firmness required. Dry sticks may be more readily carbonized than green sticks and hard or semi-hard charcoal sticks may be more readily obtained if the wood is dry when stacked in the pots. One skilled in the art of producing charcoal sticks will, of course, be able to regulate the length of the various steps and will be able to successfully carry out the method. The preheating, of course, will depend upon the condition of the wood, as well as the intensity of the heat while the wood is smoking. The point at which the burner 17 is extinguished during the gassing period will depend, of course, not only upon the grade of stick desired but upon the judgment of the operator. It is very essential that the sticks be confined and that sufficient air space be provided around the trays.

It is pointed out that the devices herein set forth are used for the purpose of explaining the method and the method does not depend upon these particular devices. While better results are had and it is more desirable to heat the pots in a kiln, it would be possible to apply heat to the pots without placing them in a kiln. It is essential to the method, however, that the sticks be confined in some suitable manner to prevent lateral distortion and curling. It is, of course, necessary to the method that the charred sticks be protected from blasts of cold air, as well as from cooling too quickly. While unquestionably better charcoal sticks are produced by cutting or sawing the sticks to uniform lengths, sizes and shapes, this is not absolutely necessary, because natural wood sticks when confined and charred in the pots as herein described produce better charcoal sticks than those now in common use.

Having illustrated and described a preferred form of the invention, what I claim, is:

1. The method of producing artists' stick charcoal of predetermined size and shape without resort to appreciable compression, which consists, in confining slender sticks of wood in restricted ducts corresponding generally in size and shape to the sticks of wood in a closed container having a vent opening, heating said container to char said sticks, charring said sticks in said container, and then gradually cooling the charred sticks before removing them from said container.

2. The method of producing artists' stick charcoal of predetermined size and shape without resort to appreciable compression, which consists, in confining small and slender sticks of wood horizontally and against lateral distortion, charring the sticks while so confined by applying heat thereto, whereby the moisture and gas are driven off, and then gradually cooling the sticks while the same are confined.

3. The method of producing artists' stick charcoal of pencil-like form which consists in restraining lateral distortion of elongated sticks of wood of small cross-sectional dimension by confining individual sticks in separate open-ended ducts in a closed container having a vent opening, heating said container to a temperature sufficient to char said sticks, then gradually cooling the charred sticks and removing said sticks from the container.

4. The method of producing artists' straight charcoal sticks of pencil-like form which consists in confining a plurality of sticks of wood in individual compartments in a container, the side walls of each compartment engaging the side surfaces of the stick confined therein to prevent lateral distortion of said stick, heating said sticks to a charring temperature, and gradually cooling said sticks before removing them from said container.

5. The method of producing artists' stick charcoal of pencil-like form which consists in depositing a plurality of elongated sticks of wood each in an individual duct within a closed container from which gases may be vented, heating said container to a temperature sufficient to char the sticks in said ducts, the heated gases within said container having access to said ducts during the entire heating step to facilitate the charring of the sticks, and then gradually cooling said sticks before removing them from said container.

6. The method of producing artists' stick charcoal of pencil-like form which consists in depositing elongated sticks of wood in individual ducts in a closed container having a vent therein, said sticks engaging only the side surfaces of said ducts to prevent lateral distortion only of the sticks, heating said container to a temperature sufficient to char said sticks, and then gradually cooling the sticks before removing them from said container.

CARL S. SALTER.